R. A. LIPPINCOTT AND E. F. BILLSON.
FASTENER FOR HINGED STRUCTURES.
APPLICATION FILED SEPT. 22, 1919.
Reissued Jan. 20, 1920.
14,793.
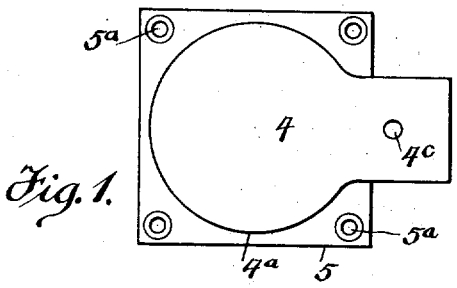
Fig. 1.
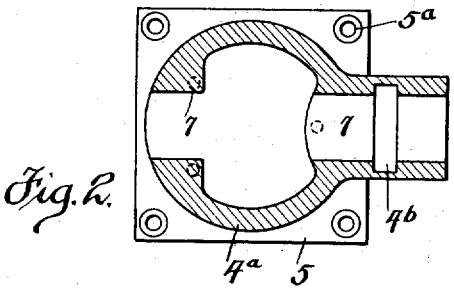
Fig. 2.
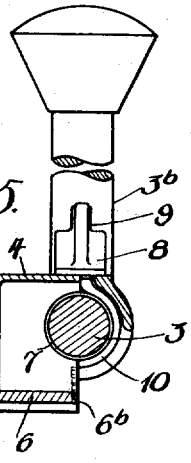
Fig. 5.
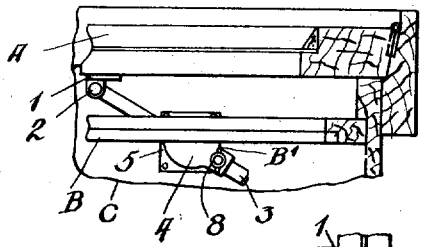
Fig. 6.
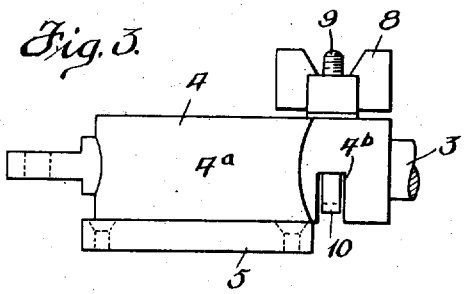
Fig. 3.
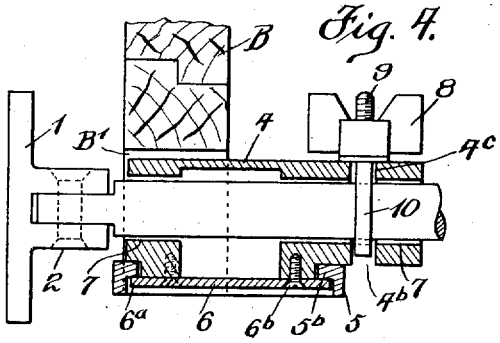
Fig. 4.
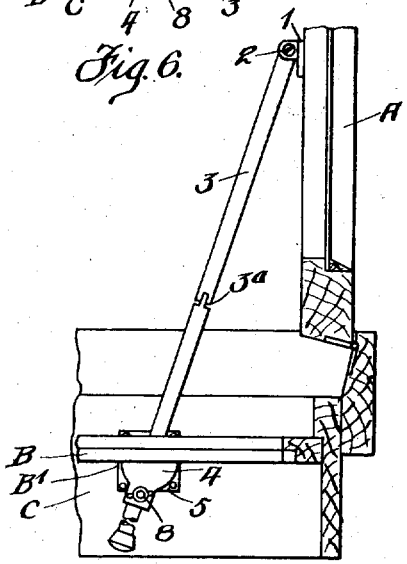
Inventor
Roy A. Lippincott, and
Edward F. Billson.
By
Attorney

UNITED STATES PATENT OFFICE.

ROY ALSTAN LIPPINCOTT AND EDWARD FIELDER BILLSON, OF MELBOURNE, VICTORIA, AUSTRALIA.

FASTENER FOR HINGED STRUCTURES.

14,793. Specification of Reissued Letters Patent. Reissued Jan. 20, 1920.

Original No. 1,297,195, dated March 11, 1919, Serial No. 256,411, filed October 1, 1918. Application for reissue filed September 22, 1919. Serial No. 325,556.

*To all whom it may concern:*

Be it known that we, ROY ALSTAN LIPPINCOTT, a citizen of the United States of America, residing at 395 Collins street, Melbourne, in the State of Victoria, Commonwealth of Australia, and EDWARD FIELDER BILLSON, a subject of the King of Great Britain and Ireland, &c., residing at 395 Collins street, Melbourne, in the State of Victoria, Commonwealth of Australia, have invented certain new and useful Improvements in Fasteners for Hinged Structures; and we do hereby declare the following to be a full, clear, and exact description of the invention, such as will enable others skilled in the art to which it appertains to make and use the same.

Our invention covers means for adjusting and fixing or fastening hinged structures such as casement windows especially those opening outward and fitted with a screen, shutter or other element through which part of the adjusting device extends to allow the window or the like to be opened or closed and held where desired without disturbing the screen, shutter, or other element. The said hinged strucure is hereinafter called the window, for brevity.

In the drawings herewith Figure 1 is a plan of one form of the casing of our fastener; Fig. 2, a horizontal section of that casing; Fig. 3 a side elevation of a casing and part of its rod and rod fixing means. Fig. 4 shows a sectional side elevation of our fastener relatively to a screen, but with part of its rod omitted. Fig. 5 is an end view of the fastener the left side of the casing being in section through the middle of the casing, and the right side in section through the right hand part of the casing in Fig. 3. The outer end of the rod is shown upwardly extended. Figs. 6 and 7 are on a smaller scale, and show our fastener in plan view with the window in its closed, and in its open position respectively.

In these drawings A is a window, B a screen, and C indicates any window sill, or like bases to which the base plate of our fastener will be fixed. 1 is a hinge plate attached to window A, and 2 a hinge pin connecting plate 1 to the end of a fastener rod, bar, or tube—shown as rod 3—which passes through a casing 4.

The said casing is rotatable relatively to the base plate 5, which is screwed down or otherwise fixed to the sill or the like C. $5^a$ are screw holes. The rod is provided in some cases with means by which to (especially when the window is closed) prevent undue projection of the rod into the room or so on, as it is found that a long horizontally projecting rod has many disadvantages. Thus the rod may be telescopic, but we show by way of example a hinge or joint $3^a$ in the rod. There may be a plurality of these hinges; as a result the rod end may be swung (for example upward) as at $3^b$ in Fig. 5.

As one means of making casing 4 rotatable we show the base plate 5 flanged inwardly at $5^b$ to provide a keeper rim over an edge $6^a$ of a plate or suitable member 6 which is fixed as by screws $6^b$ to form the underside of casing 4. Part of the casing body has a cylindrical out wall $4^a$ occupying a recess or part of a recess $B^1$ in the screen B to prevent draft and to exclude dust, insects, and so on, as in every position which the rotatable body assumes it will sufficiently occupy the screen recess to cause such exclusion. The screen is not necessarily located with its aperture inclosing one side of the casing as shown. Casing 4 is apertured to have any suitable internal guide and bearing surface 7 for the rod 3, whereby as the window is opened or closed that rod slides through the aperture. The casing is provided with suitable means to fix the rod so that the window can be held in any desired position.

An an example a finger nut 8 is shown, engaging the shank 9 of a gripping member which is movable to fix rod 3 or to release it as required.

This gripping member is shown formed as an eye 10 in which rod 3 is a loose fit. The finger nut 8 (or a washer under it) bears on casing 4, and rotation of the nut raises the eye till the latter grips the rod tightly. $4^b$ is a slot in casing 4 to allow of assembling the parts, and $4^c$ is a hole for shank 9. If it is desired to have a fastening with which persons cannot so easily tamper, a plain nut can be substituted for the finger nut, or other means may be used to prevent the rod sliding.

Operating member 3 on sliding or moving through the part of casing 4 it engages rotates that casing, which continuously keeps aperture $B^1$ closed in obstruction B, contiguous to the hinged structure to which member 3 is pivotally connected.

Having described this invention what we claim Letters Patent for is:—

1. Controlling means for swinging closures, comprising in combination a swinging closure and its casing, a rod pivoted to the closure, a casting pivotally mounted on the casing, said casting having a cylindrical body and an extension projecting therefrom, the casting having a rod receiving opening extending therethrough and a notch which communicates with the opening, an eye mounted in the extension and provided with a threaded stem, the eye being seated in the notch in the extension and adapted to engage the rod and the threaded stem passing through the extension, and a lock nut engaging the threaded extension.

2. Controlling means for swinging closures, comprising in combination a swinging closure and its casing, a rod pivoted to the closure, a casting having an annular flange and an adjacent annular groove, a fixed annular flange on the casing to engage in the annular groove to provide a pivotal connection for the casting, the casting having a cylindrical body portion and an extension through which the rod passes, and means carried by the extension to lock the rod in adjusted position.

ROY ALSTAN LIPPINCOTT.
EDWARD FIELDER BILLSON.